United States Patent [19]

Pattie

[11] Patent Number: 5,768,015
[45] Date of Patent: Jun. 16, 1998

[54] OPTICAL ISOLATOR

[75] Inventor: Robert Alan Pattie, Nyora, Australia

[73] Assignee: Telstra Corporation Limited, Melbourne, Australia

[21] Appl. No.: 464,645

[22] PCT Filed: Dec. 16, 1993

[86] PCT No.: PCT/AU93/00663

§ 371 Date: Jun. 21, 1995

§ 102(e) Date: Jun. 21, 1995

[87] PCT Pub. No.: WO94/15243

PCT Pub. Date: Jul. 7, 1994

[30] Foreign Application Priority Data

Dec. 22, 1992 [AU] Australia ............... PL6504/92

[51] Int. Cl.$^6$ ................... G02B 5/30; G02F 1/09
[52] U.S. Cl. .............. 359/484; 359/495; 359/497; 359/282; 372/703; 385/6; 385/11
[58] Field of Search ................. 359/281, 282, 359/484, 494, 495, 497, 501; 372/703; 385/6, 11

[56] References Cited

U.S. PATENT DOCUMENTS

| | | | |
|---|---|---|---|
| 4,178,073 | 12/1979 | Uchida et al. | |
| 4,239,329 | 12/1980 | Matsumoto | 385/33 |
| 4,712,880 | 12/1987 | Shirasaki | 359/484 |
| 4,720,162 | 1/1988 | Mochizuki et al. | 385/11 |
| 4,746,191 | 5/1988 | Kawakami et al. | 385/11 |
| 4,852,962 | 8/1989 | Nicia | 359/484 |
| 4,856,878 | 8/1989 | Wilson et al. | |
| 4,973,120 | 11/1990 | Jopson et al. | 359/484 |
| 4,974,944 | 12/1990 | Chang | 359/497 |
| 4,978,189 | 12/1990 | Blonder et al. | |
| 4,988,170 | 1/1991 | Buhrer | 359/497 |
| 5,029,953 | 7/1991 | Dexter et al. | 359/484 |
| 5,031,983 | 7/1991 | Dillon et al. | |
| 5,040,863 | 8/1991 | Kawakami et al. | 359/484 |
| 5,052,786 | 10/1991 | Schulz | 359/484 |
| 5,111,330 | 5/1992 | Van Delden et al. | 359/484 |
| 5,267,078 | 11/1993 | Shiraishi et al. | 359/484 |
| 5,278,853 | 1/1994 | Shirai et al. | 372/703 |

FOREIGN PATENT DOCUMENTS

| | | |
|---|---|---|
| A0252509 | 1/1988 | European Pat. Off. . |
| A0390604 | 10/1990 | European Pat. Off. . |
| A0413566 | 2/1991 | European Pat. Off. . |
| A0512783 | 11/1992 | European Pat. Off. . |
| A0533398 | 3/1993 | European Pat. Off. . |
| 108451 | 9/1978 | Japan ............... 359/484 |
| 0006326 | 1/1980 | Japan ............... 359/484 |
| 184225 | 9/1985 | Japan ............... 359/484 |
| 0020523 | 1/1989 | Japan ............... 359/484 |
| 4073712 | 3/1992 | Japan ............... 359/484 |
| 4077713 | 3/1992 | Japan ............... 359/484 |
| 4102821 | 4/1992 | Japan ............... 372/703 |
| 9114193 WO A | 9/1991 | WIPO ............... 359/484 |
| 91/14199 | 9/1991 | WIPO . |

OTHER PUBLICATIONS

Shiraishi et al., "Cascaded Optical Isolator Configuation Having High-Isolation Characteristics Over a Wide Temperature and Wavelength Range", *Optical Society of America*, vol. 12, No. 7, Jul. 1987.

*Primary Examiner*—Ricky D. Shafer
*Attorney, Agent, or Firm*—Wolf, Greenfield & Sacks, P.C.

[57] ABSTRACT

An optical isolator includes two polarizers two input/output ports formed respectively on the two polarizers and an optical rotator disposed between the two polarizers, the optical rotator including a Faraday rotator and a reciprocal optical rotator being selectively configured so the isolator performs one of a plurality of isolator functions.

9 Claims, 8 Drawing Sheets

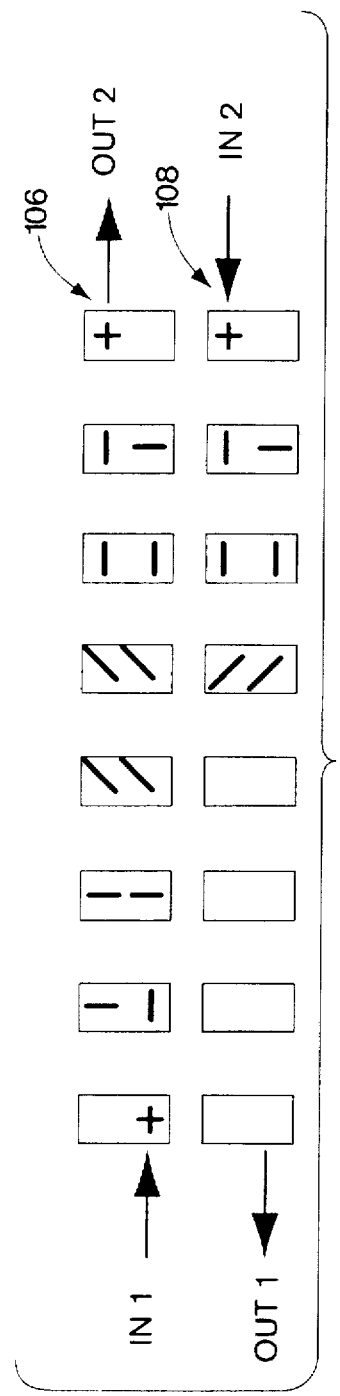

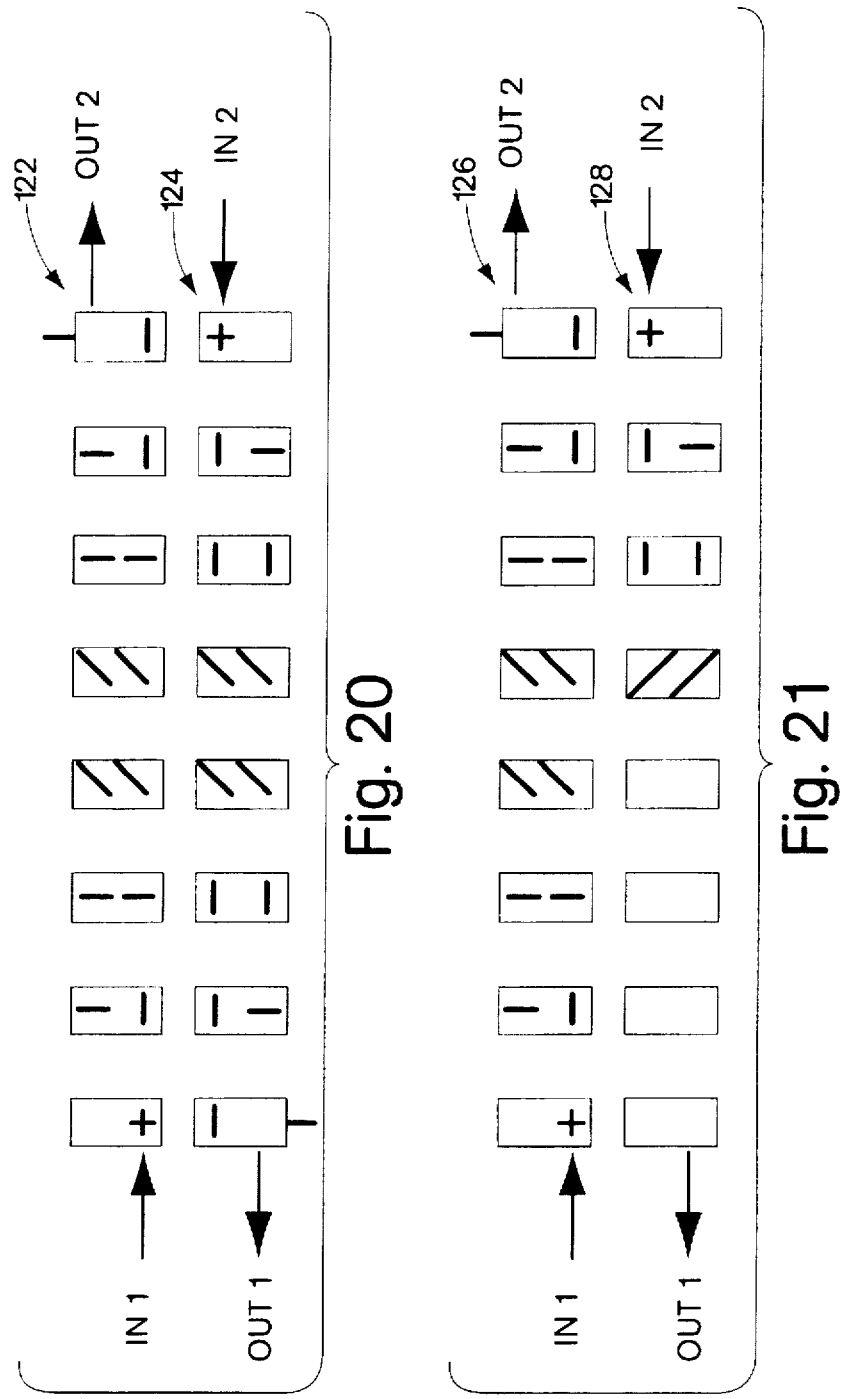

OPTICAL ISOLATOR

The present invention relates to an optical isolator, and in particular, an isolator which is wavelength selective.

Optical isolators are used in optical communications systems to restrict, or isolate, the direction of travel of optical signals to one direction over a broad wavelength band. It has also recently been discovered that there is application for isolators which are wavelength selective and restrict a first wavelength band to one direction of travel, and a second wavelength band to the opposite direction, as discussed in International Patent Application No. PCT/AU93/00258 for a bidirectional isolator.

The present invention, more specifically, relates to using the wavelength dispersion characteristics of optical rotator materials, such as Faraday rotator materials, to provide isolator functions, and, in some instances, enhance performance.

Faraday rotators rotate polarised signals of a wavelength band $\lambda$ by a selected number of degrees in a set clockwise or anticlockwise direction, regardless of whether the signals travel through the rotator in a forward or reverse direction. Faraday rotators are normally constructed from YIG, which is Yttrium based, or BIG, which is based on Bismuth substituted YIG. Optical rotators can also be provided by multi-order half-wave plates, which can be cut from quartz and used to rotate optical signals of wavelength $\lambda$ by a predetermined number of degrees. Unlike Faraday rotators, the half-wave plates will rotate a signal of wavelength $\lambda$ in one direction as it passes therethrough in a forward direction but will perform a reciprocal rotation, by rotating the signal in the opposite direction, when it passes through the wave plate in the reverse direction. Reciprocal optical rotators can also be fabricated from optically active material which continuously rotates polarised light along its length in a linear polarization state. Half-wave plates rotate linearly polarized light by changing it to an elliptical polarization state and then back to a linear polarization state. Half-wave plates normally can achieve a desired rotation in a much shorter length of material than optically active material, which can also be cut from quartz.

The term wavelength dispersion is used herein to describe a characteristic of a device which processes differently or has a different effect on signals of different wavelengths. Similarly, the term polarization dispersion is used to refer to a characteristic of a device which processes differently or has a different effect on signals of different polarizations.

Previously the dispersion characteristic of a Faraday material in a cascaded isolator assembly has only been used to achieve isolation of a broader signal wavelength band, as discussed in Kazuo Shiraishi and Shorjiro Kawakami, "Cascaded optical isolator configuration having high-isolation characteristics over a wide temperature and wavelength range" Optics Letters, Volume 12, No. 7, July 1987, pages 462 to 464.

In accordance with the present invention there is provided an optical isolator comprising two polarizer means, two input/output ports formed respectively on said polarizer means, and optical rotator means disposed between said polarizer means, said optical rotator means including Faraday rotator means and being selectively configured so that the isolator performs one of a plurality of isolator functions.

Advantageously the wavelength dispersion characteristics of said optical rotator means may determine said one of said isolator functions for at least two wavelength bands.

Preferred embodiments of the present invention are hereinafter described, by way of example only, with reference to the accompanying drawings, wherein:

FIG. 16 is polarization diagrams for normal operation of the isolator of FIG. 15 for light of wavelength $\lambda_2$;

FIG. 17 is polarization diagrams for normal operation of the isolator of FIG. 15 for light of wavelength $\lambda_1$;

Figure 15:
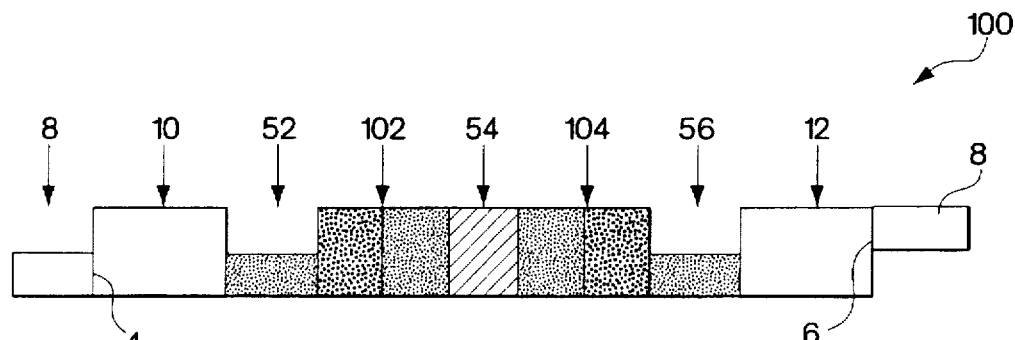
FIG. 15 is a side view of fifth preferred embodiment of an isolator.
Figure 8:
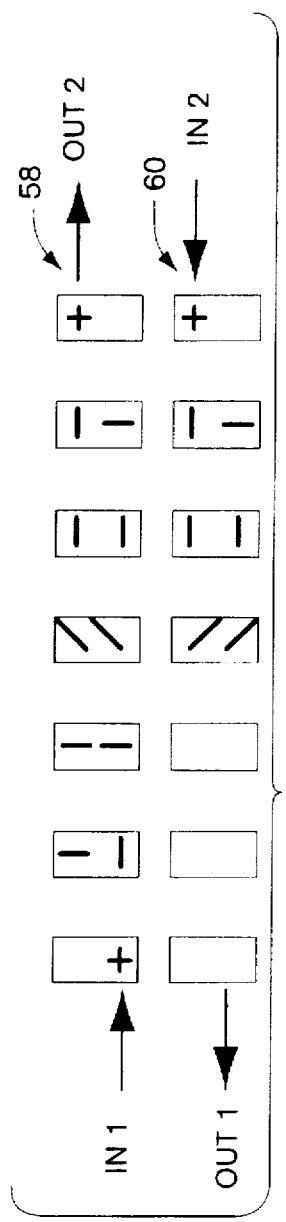
FIG. 8 is polarization diagrams for normal operation of the isolator of FIG. 7.
Figure 18:
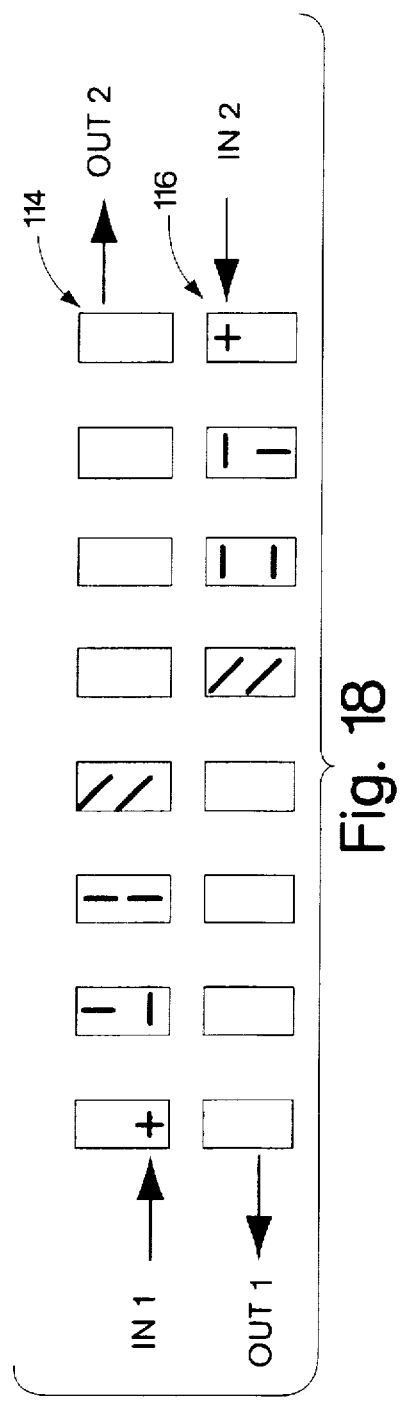
Figure 19:
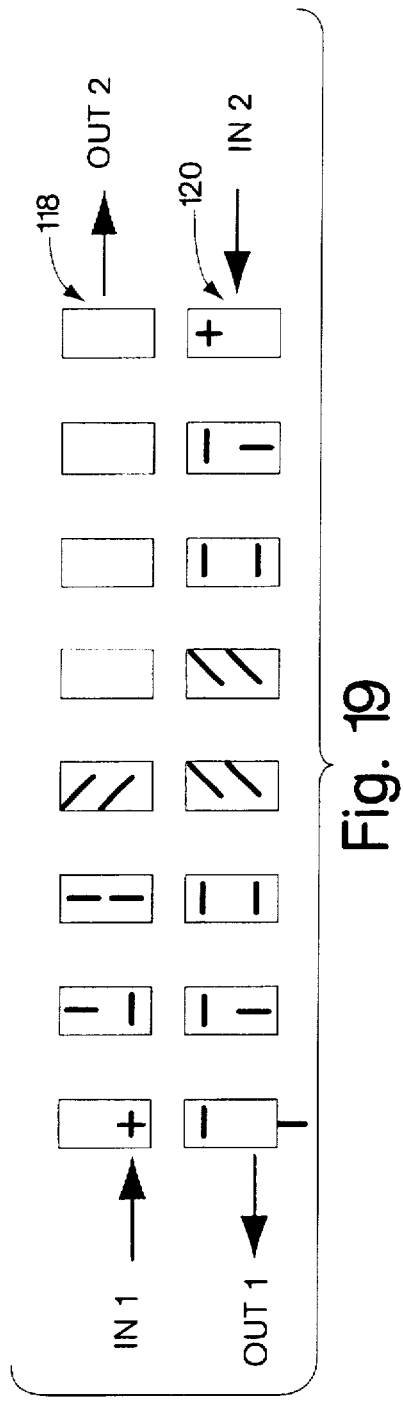

FIG. 18 is polarization diagrams for the isolator of FIG. 15 for light of wavelength $\lambda_2$ when errors occur in a first Faraday/optical rotator, FIG. 19 is polarization diagrams for the isolator of FIG. 15 for light of wavelength $\lambda_1$ when errors occur in a first Faraday/optical rotator, FIG. 20 is polarization diagrams for the isolator of FIG. 15 for light of wavelength $\lambda_2$ when errors occur in a second Faraday/optical rotator, and FIG. 21 is polarization diagrams for the isolator of FIG. 15 for light of wavelength $\lambda_1$ when errors occur in a second Faraday/optical rotator.

Figure 1:
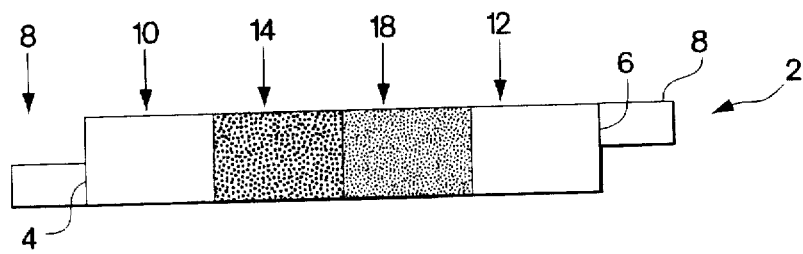
FIG. 1 is a side view of a first preferred embodiment of an isolator.

A first optical isolator 2, as shown in FIG. 1, includes first and second input ports 4 and 6 formed at the junction of respective graded refractive index (GRIN) lenses 8 and spatial walk-off polarizers (SWP) 10 and 12. The GRIN lenses 8 are used to connect the ends of fibres to the isolator 2 and direct incoming and outgoing optical signals between the isolator 2 and the optical fibres with minimum insertion loss. The isolator 2 also includes a Faraday rotator 14 and a reciprocal optical rotator 18 disposed between the SWPs 10 and 12, such that all of the components form an in line series assembly. The first SWP 10 separates signals received on the first port 4 into vertically polarized and horizontally polarized components, and walks the vertical component upwards, and performs the reciprocal operation on components travelling in the reverse direction, i.e., from the second port 6 to the first port 4. The second SWP 12 also walks vertically polarized components upwards with respect to received horizontally polarized components, when the components travel in the forward direction from the first port 4 to the second port 6. Again, the second SWP 12 performs the reciprocal operation for components travelling the reverse direction, by walking vertically polarized components down with respect to the received horizontal components. The SWPs may be both formed from calcite. The assembly of the isolator 2 can be considered to have an upper and a lower section, where the first port 4 is aligned with the lower section and the second port 6 is aligned with the upper section.

(d) Isolate signals of $\lambda_2$ in one direction and isolate signals of $\lambda_1$ in the opposite direction. This allows the isolator 2 to function as a bidirectional isolator.

The different combinations of Faraday and optical rotators 14 and 18 which can be selected to provide the functions (a) to (d) are shown in Table 1 below, which is discussed hereinafter.

TABLE 1

FARADAY ROTATOR
(Odd and even refer to odd and even multiples of 45 degree rotation)

| Function | same plane odd $\lambda_1$ odd $\lambda_2$ | orthogonal planes odd $\lambda_1$ odd $\lambda_2$ | $\lambda_2$ plane +45 with respect to $\lambda_1$ plane even $\lambda_1$ odd $\lambda_2$ | $\lambda_2$ plane −45 with respect to $\lambda_1$ plane even $\lambda_1$ odd $\lambda_2$ | # $\lambda_1$ odd $\lambda_2$ | Effective Optical Rotation Examples $\lambda_1$ | $\lambda_2$ | General Optical Rotator Requirements |
|---|---|---|---|---|---|---|---|---|
| (a) Isolate $\lambda_1$ & $\lambda_2$ | • | | | | | 0 | 0 | Always keeps both $\lambda_1$ and $\lambda_2$ in the same plane |
| | | | | | | +45 | +45 | |
| | | | | | | −45 | −45 | |
| | | • | | | | +45 | −45 | Always moves both $\lambda_1$ and $\lambda_2$ into the same plane |
| | | | | | | −45 | +45 | |
| (b) Transparent to $\lambda_1$ & isolate $\lambda_2$ | | | • | | | +45 | 0 | Always moves both $\lambda_1$ and $\lambda_2$ into the same plane |
| | | | | | | 0 | −45 | |
| | | | | • | | −45 | 0 | Always moves both $\lambda_1$ and $\lambda_2$ into the same plane |
| | | | | | | 0 | +45 | |
| (c) Partially isolate $\lambda_1$ & isolate $\lambda_2$ | | | | | • | # | ∓45 | Always moves both $\lambda_1$ and $\lambda_2$ into the same plane |
| (d) Isolate $\lambda_1$ forward & isolate $\lambda_2$ backward | | • | | | | +45 | −45 | Always moves both $\lambda_1$ and $\lambda_2$ into orthogonal planes |
| | | | | | | −45 | +45 | |
| | | | | • | | +45 | +45 | Always keeps both $\lambda_1$ and $\lambda_2$ in orthogonal planes |
| | | | | | | −45 | −45 | |

The Faraday rotator 14 and the optical rotator 18 are configured so as to provide one of a plurality of isolator functions for the isolator 2 for two or more wavelength bands. For example, if $\lambda_1$ and $\lambda_2$ denote first and second wavelength bands, the functions may comprise:

(a) Isolate signals of $\lambda_1$ and $\lambda_2$ for one direction. First wavelength $\lambda_1$ may be 1300 nm and the second, $\lambda_2$ may be 1500 mm. This function would provide isolation for separate wavelength bands.

(b) Isolate signals of $\lambda_2$ for one direction and allow signals of $\lambda_1$ to travel through the isolator in both directions, i.e., allow the isolator 2 to be transparent to $\lambda_1$. For example, either 1300 or 1550 nm could be isolated and the other wavelength used for optical system communications. Also 1550 nm could be isolated and the assembly transparent to 1480 nm to reduce undesirable noise in doped fibre devices, such as rare earth amplifiers. The uninhibited wavelength $\lambda_1$ could also be used to perform OTDR analysis on the system, as discussed in International Patent Application No. PCT/AU93/00258.

(c) Signals of $\lambda_2$ are isolated for one direction and signals of $\lambda_1$ may be partially isolated. This is relatively easy to achieve for most wavelength combinations of interest without producing a device which is overly sensitive to temperature variations. This function may be used for the same applications as discussed for (b), except $\lambda_1$ cannot be used effectively for OTDR analysis.

The functions (a) to (d) are listed in the left hand column, and the type of Faraday rotator 14 required is marked with an *. The types of Faraday rotators are characterised by firstly the planes of polarization which signals of the two wavelengths appear in after rotation by the Faraday rotator 14, i.e., the same plane, orthogonal to one another, or signals of $\lambda_2$ leading or lagging $\lambda_1$ by 45°. The notation +45° refers to clockwise rotation and −45° to anticlockwise rotation. Secondly, the type is characterised by whether the signals of $\lambda_1$ or $\lambda_2$ are rotated by an odd or even number of 45° rotations. The effective rotation required to be achieved by the optical rotator, for each wavelength $\lambda_1$ and $\lambda_2$, to ensure the Faraday rotator 14 and reciprocal optical rotator 18 combination achieves the desired function for each case, is listed in the three right hand columns of Table 1.

The length of the Faraday rotator 14, which governs the length of the light transmission path therethrough, is selected so as to provide the rotator with a wavelength dispersion characteristic which gives rise to the desired polarization component rotation ±m 180°, where m is a non-negative integer. Similarly, the optical path length of the reciprocal optical rotator 18 is selected to provide a wavelength dispersion characteristic which achieves the desired effective rotation ±m 180°. The reciprocal optical rotator may comprise half-wave plate or optically active material. The thinnest Faraday rotator 14 which provides an effective rotator combination is selected as the temperature sensitivity of the Faraday rotator 14 increases with increasing thickness.

The function (c) is a special case in that for the partially isolated wavelength $\lambda_1$ it is only desired to ensure that signals of $\lambda_1$ travel in one direction, whereas in the reverse direction it is unimportant whether the $\lambda_1$ signals are inhibited or allowed to pass through the isolator 2. The band $\lambda_1$ may be used, for example, to pass pump signals through the isolator 2 to an optical amplifier. Normally pump signals are introduced between the isolator associated with an amplifier, and enabling the signals to be passed through one of those isolators instead significantly improves the noise characteristic of the optical system including the amplifier and isolators. The # in the column for $\lambda_1$ of the optical rotator 18 and in the Faraday rotator column indicates that Faraday and optical rotators are selected to achieve the same total effective rotation as that for $\lambda_2$ in the forward direction. Yet, the total effective rotation produced by the combination in the reverse direction for $\lambda_1$ is of no concern.

If the reciprocal optical rotator is required to perform the same effective rotation, according to Table 1, for $\lambda_1$ and $\lambda_2$ then it can be omitted from isolator 2, which requires the SWP 12 to then be reoriented to take the omission into account. The Faraday rotator must in this case rotate the polarization components to be parallel and perpendicular to the SWP walk-off direction.

Figure 2:
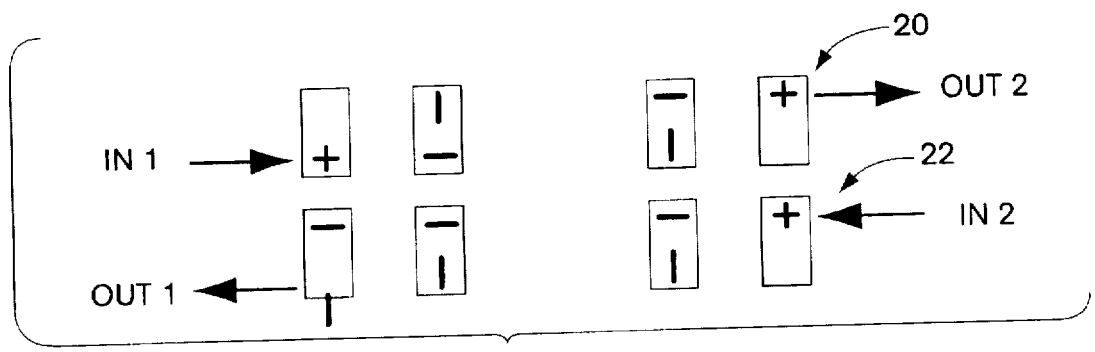
FIG. 2 is polarization diagrams for the isolator of FIG. 1 for light of wavelength $\lambda_2$.
Figure 3:
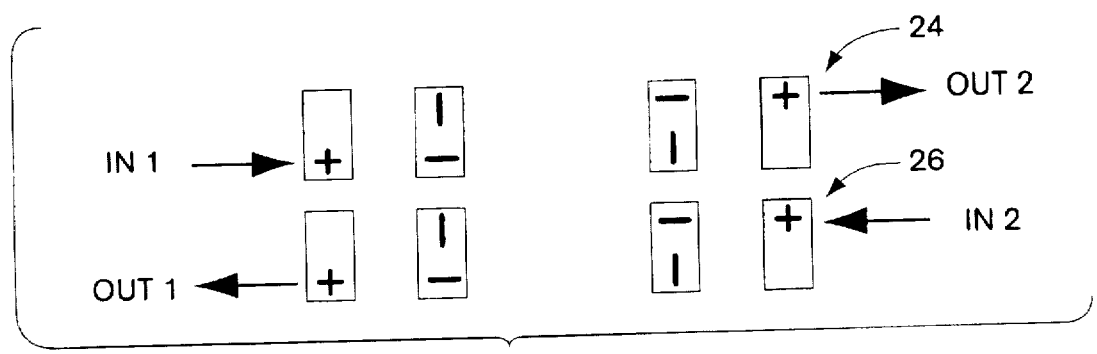
FIG. 3 is polarization diagrams for the isolator of FIG. 1 for light of wavelength $\lambda_1$.

The isolator 2 in FIG. 1 may be configured to perform any one of the functions (a) to (d) but is described hereinafter as configured to perform function (b). The polarization diagrams of FIGS. 2 and 3 show the polarization components and the positions of the components at each of the interfaces of the parts 10 to 12 of the isolator 2, when viewed from the first port 4 of the isolator 2. The polarization diagrams of FIGS. 5, 6, 8, 9, 10, 12, 13, 14 and 16 to 21 adopt the same convention, and omit representations for the interfaces between the Faraday rotators 14 and optical rotators 18.

With reference to the forward direction diagram 20 of FIG. 2, the vertical component of light incident on the first port 4 is walked up to the upper section of the Faraday rotator 14 by the first SWP 10, whereas the horizontal component is allowed to pass unchanged. Both components are rotated 90°, i.e., ±90°±m180°, by the Faraday/optical rotator combination 14, 18, and then the lower vertically polarized component is walked up by the second SWP 12 to be incident on the second port 6 with the horizontally polarized component. In the reverse direction diagram 22, light incident on the second port 2 follows the same path to the rotator combination 14, 18, but in this direction the components effectively undergo no rotation, i.e., ±m 180°. The upper horizontally polarised component is allowed to pass unchanged by the first SWP 10 so as to be dispersed above the first port 4, and the lower vertically polarised component is walked downwards out of the isolator 2 before reaching the first port 4. For signals of wavelength $\lambda_1$, with reference to the forward direction diagram 24 of FIG. 3, the components of the signals incident on the first port 4 follow the same path as those of $\lambda_2$ as shown in diagram 20. However in the reverse direction, as shown in diagram 26, the signals of $\lambda_1$ are rotated by 90° by the rotator combination 14, 18 so a vertically polarized component appears at the upper section of the first SWP 10 and can be walked down to a horizontal component so that both components are incident at the first port 4.

Figure 4:
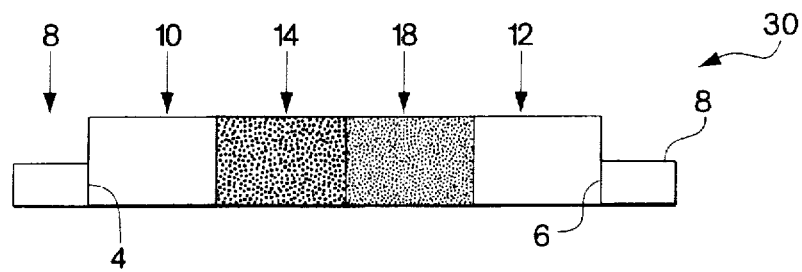
FIG. 4 is a side view of a second preferred embodiment of an isolator.

With the ports 4 and 6 displaced vertically by the spatial walk-off distance as illustrated in FIG. 1, both polarized components travel the same distance through the isolator 2, which gives minimum polarization dispersion. However the spatial walk-off distance of the SWPs has a slight wavelength dependency, so as the components are only walked in one direction, the isolator 2 is more sensitive to the wavelength dispersion of the SWPs 10 and 12. The insertion loss due to the wavelength dependence of the SWPs; 10 and 12 can be minimised by aligning the GRIN lenses as shown in FIG. 4 for a second isolator 30. This however is at the cost of minimising polarization dispersion as the polarized components of signals will now travel different distances between the first port 4 and the second port 6. The second isolator 30 can also be used to perform all of the functions (a) to (d).

Any one of the isolator assemblies discussed herein may be configured with the first and second ports 4 and 6 aligned or not aligned, and the same isolator function is performed provided the last SWP 12 and GRIN lens 8 or the last SWP 12, GRIN lens 8 and last half-wave plate for isolators having multiple half-wave plates, are rotated by 180°. This may, however, require some alteration of the effective rotation performed by rotators in the isolator. A polarizer can be included at the face of a Faraday rotator which is the closest to an SWP 10 or 12 to enhance the performance of each isolator 2.

Figure 5:
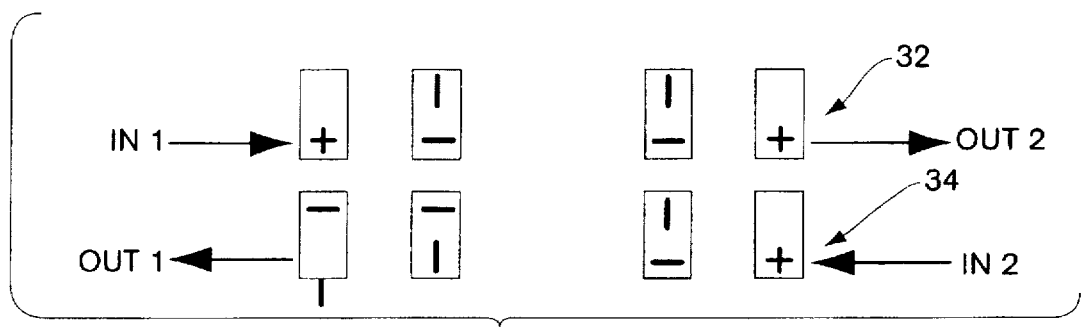
FIG. 5 is polarization diagrams for the isolator of FIG. 4 for light of wavelength $\lambda_2$.
Figure 6:
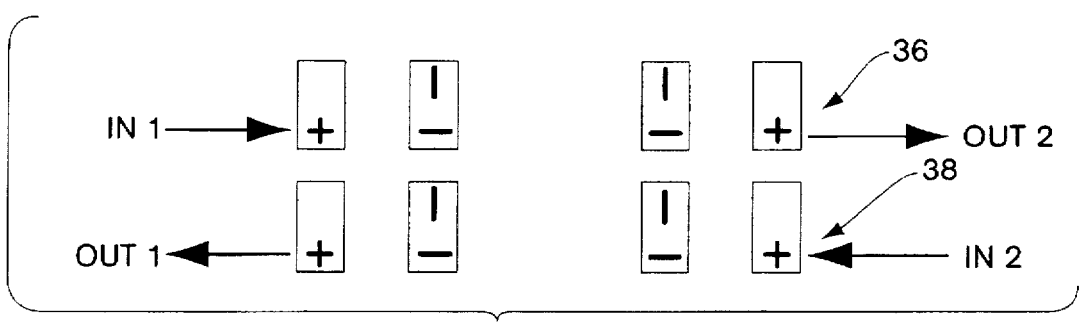
FIG. 6 is polarization diagrams for the isolator of FIG. 4 for light of wavelength $\lambda_1$.

With reference to the polarization diagram 32 of FIG. 5, signals of wavelength $\lambda_2$ incident on the first port 4 of the second isolator 30 are split into a vertically polarized component which is walked up to the Faraday rotator 14 and a horizontally polarized component is unchanged by the first SWP 10. The rotator combination 14, 18 is now configured to effect no rotation on the components in the forward direction but effects the 90° rotation on the components in the reverse direction, as the second SWP 12 has been rotated by 180° with the GRIN lens 8 of the second port 6. The SWP 12 therefore walks the vertically polarized component down to the horizontally polarized component so that both components are incident on the second port 6. Light incident on the second port 6, with reference to the diagram 34, travels the same path until the components are rotated 90° by the rotator combination 14, 18. A horizontally polarized component is then passed by the first SWP 10 unchanged to be dispersed above the first port 4, and the vertical component received by the SWP 10 is walked out of the isolator 2 before reaching the first port 4. For signals of wavelength $\lambda_1$, as shown in the polarization diagrams 36 and 38 of FIG. 6 for the forward and reverse directions respectively, signals incident on the first port 4 follow the same path as that shown in the diagram 32 of FIG. 5. However, in the reverse direction the rotator combination does not effect a rotation on the incident components so a vertical component is incident on the first SWP 10 in the upper section, and a horizontal component in the lower section. Therefore the first SWP 10 walks the vertical component down to the horizontal component so that both are incident on the first port 4.

Figure 7:
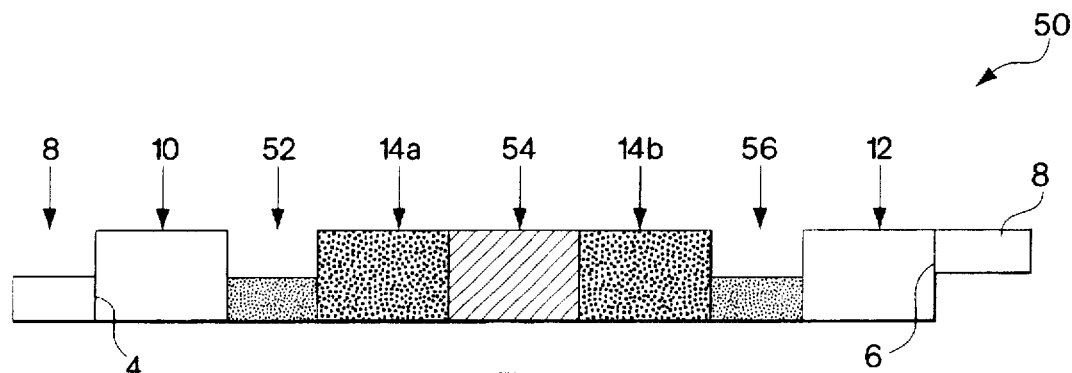
FIG. 7 is a side view of a third preferred embodiment of an isolator.
Figure 11:
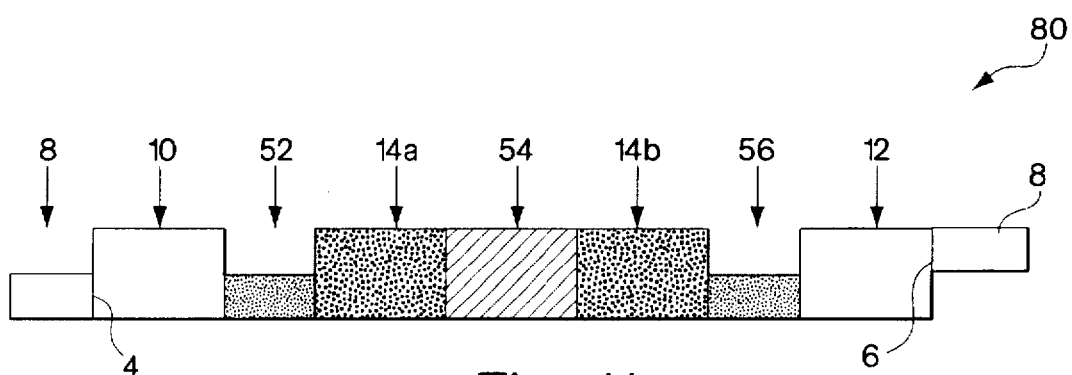
FIG. 11 is a side view of a fourth preferred embodiment of an isolator.

The first and second isolators 2 and 30 are sensitive to errors in the rotators which may be induced by temperature or wavelength fluctuations. The third and fourth isolators 50 and 80 of FIGS. 7 and 11 are able to perform functions (a) and (d) and are less sensitive to Faraday errors. Erroneous components included by Faraday errors should not appear at the ports 4 and 6.

The third isolator 50 includes a rotator combination comprising two Faraday rotators 14a, 14b with a polarizer 54 disposed between them. The rotators 14a, 14b both perform an effective rotation of 45°. A first half-wave plate 52 is disposed between the rotator combination and the first SWP 10, and a second half-wave plate 56 is disposed between the rotated combination and the second SWP 12. The first and second ports 4 and 6 are not aligned, and the half-wave plates 52 and 56 are aligned with the first port in the lower section of the isolator 50. The half-wave plates each perform an effective 90° rotation of all signals. The rotator combination 14a,54, 14b rotates horizontal and vertical components received into the same polarization plane. The polarizer 54 only allows light polarized in the 45°–225° plane to pass therethrough. The isolator 50 is configured to perform function (a) with 0° effective optical rotator rotation, i.e., no optical rotators are required. For designs which include a plurality of Faraday rotators or optical rotators, as in the isolator 50 of FIG. 7, each must meet the requirements of Table 1. With reference to the forward direction polarization diagram 58 of FIG. 8, light incident on the first port 4 is split into horizontal and vertical components by the first SWP 10, with the horizontal component being incident on the first half-wave plate 52, and the vertical component being walked up to the transmissive medium, e.g., 0° half-wave plate, immediately above the half-wave plate 52. The horizontal component is rotated 90° by the half-wave plate 52 so both components are polarized in the same plane when incident on the first rotator 14a. The components are rotated into the 45°–225° plane and are allowed to pass by the polarizer 54 to the second rotator 14b, which rotates the components into the horizontal plane. The second half-wave plate 56 rotates the lower component 90° into the vertical plane, and this vertical component is then walked up to the horizontal component by the second SWP 12, so both components are incident on the second port 6. Light incident on the second port 6 returns via the same path, as shown in the reverse direction polarization diagram 60, until the two horizontally polarized components are incident on the second rotator 14b. The two components are rotated by the second rotator 14b into the 135°–315° diagonal plane, which is orthogonal to the plane of the polarizer 54. The components are therefore inhibited by the polarizer 54 and no light appears in the first rotator 14a or at the first port 4.

Figure 9:
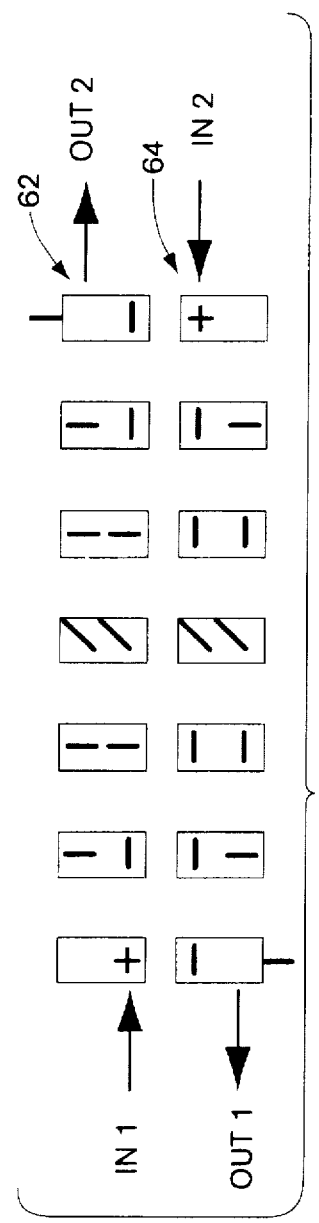
FIG. 9 is polarization diagrams for the isolator of FIG. 7 when errors occur in a second Faraday rotator.

If an error is induced in the second Faraday rotator 14b such that some effective rotation of the components is performed in the reverse direction, i.e., anticlockwise, then in the forward direction, as shown in the polarization diagram 62 of FIG. 9, the second Faraday rotator 14 outputs two components polarised in the vertical plane, instead of the horizontal plane. The lower component is rotated by the second half-wave plate 56 into the horizontal plane and is allowed to pass unchanged by the second SWP 12 so as to be dispersed below the second port 6. The vertical component passed above the half-wave plate 56 is walked up by the second SWP 12 out of the isolator 50 before reaching the second port 6. In the reverse direction, as shown in the reverse direction diagram 64, the second rotator 14b will output components polarised in the 45°–225° plane which are allowed to pass to the first rotator 14a by the polarizer 54. The components are rotated into the horizontal plane by the first rotator 14a, and the lower component is rotated 90° into the vertical plane by the first half-wave plate 52. The upper horizontally polarized component passes above the half-wave plate 52 through the first SWP 10 unchanged so as to be dispersed above the first port 4. The vertical component emitted by the half-wave plate 52 is walked out of the isolator 50 below the first port by the first SWP 10.

Figure 10:
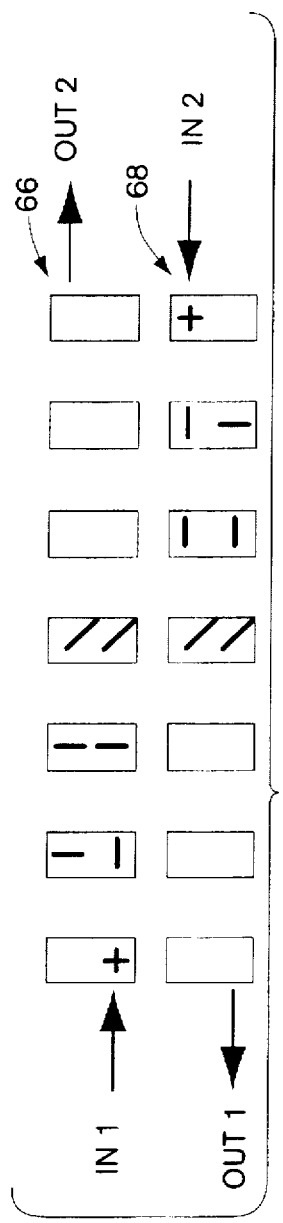
FIG. 10 is polarization diagrams for the isolator of FIG. 7 when errors occur in a first Faraday rotator.
Figure 12:
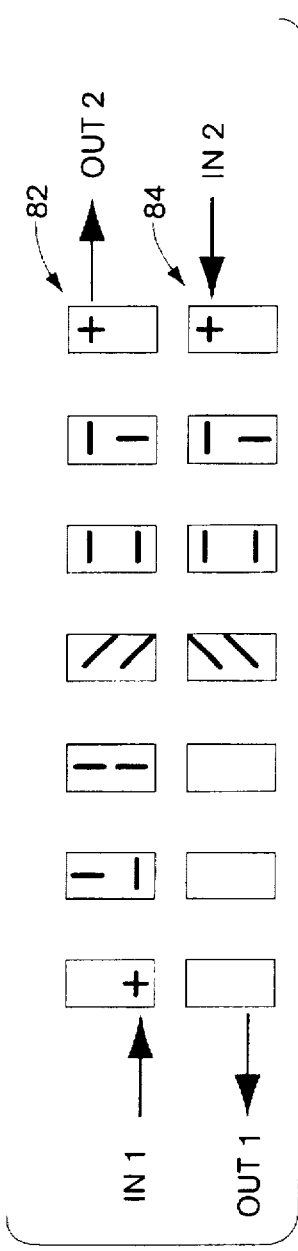
FIG. 12 is polarization diagrams for normal operation of the isolator of FIG. 11.
Figure 13:
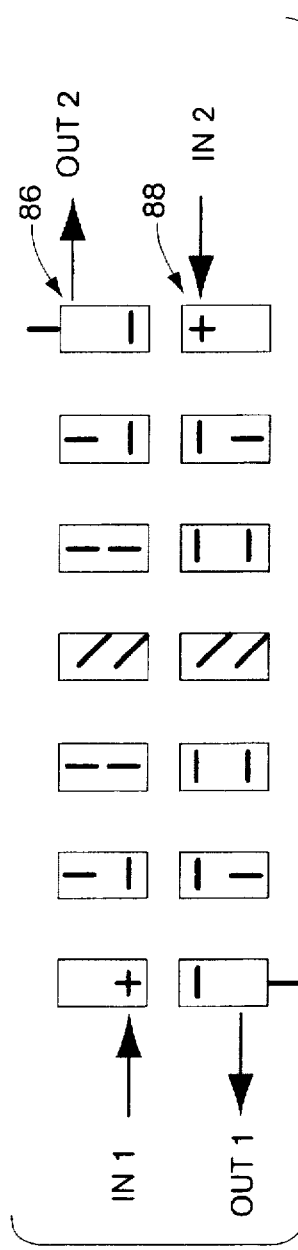
FIG. 13 is polarization diagrams for the isolator of FIG. 11 when errors occur in a second Faraday rotator.
Figure 14:
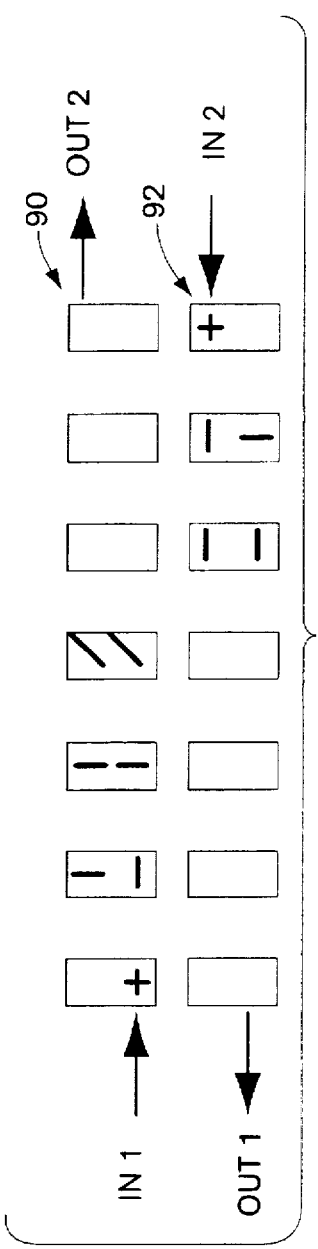
FIG. 14 is polarization diagrams for the isolator of FIG. 11 when errors occur in a first Faraday rotator.

If a similar error occurs in the first Faraday rotator 14a, for the forward direction, as shown in the polarization diagram 66 of FIG. 10, the Faraday rotator 14a produces components polarized in the 135°–225° plane which are immediately inhibited from proceeding further by the polarizer 54. The reverse direction polarization diagram 68 of FIG. 10 is the same as the reverse direction diagram 60 of FIG. 8 for normal operation.

The fourth isolator 80 of FIG. 11 is the same as the third isolator 50, except the first and second rotators 14a and 14b perform their effective 45° rotation in the anticlockwise direction, instead of the clockwise direction, so the polarizer 54 polarizes light in the 135°–315° plane, instead of the 45°–135° plane. Outside of the rotator combination 14,54, light travels precisely the same path through the fourth isolator 80 as for the third isolator 50, as shown in the forward and reverse polarization diagrams 82 and 84 of FIG. 12 for normal operation of the isolator 80, the forward and reverse direction polarization diagrams 86 and 88 of FIG. 13 where the second rotator 14b induces errors and the forward and reverse direction polarization diagrams 90 and 92 of FIG. 14 where the first Faraday rotator 14a introduces errors.

The third and fourth isolators 50 and 80 illustrate that the same function can be performed provided the Faraday rotator combination provides effective rotation which is an odd multiple of 45°.

A fifth isolator 100 has the same structure as the third and fourth isolators 50 and 80, except the Faraday rotators 14 are replaced by two Faraday/optical rotators 102 and 104, which are Faraday rotator 14 and reciprocal optical rotator 18 combinations. The structure of the fifth isolator 100 can be used to realize all of the four functions (a) to (d). The structure can also invoke rotations which are odd integer multiples of 45° for both $\lambda_1$ and $\lambda_2$, where the polarized components appear in orthogonal planes for function (a), and appear in the same plane for function (d), as indicated in Table 1. This cannot be achieved using the structure of the third and fourth isolators. The structure is also not sensitive to rotator errors, as errors induced by the rotators 102 and 104 are not passed to the ports 4 or 6.

Considering the fifth isolator when configured to perform function (b), light of the second wavelength $\lambda_2$ incident on the first port 4 is split into a vertical component which is walked up by the first SWP 10, and a horizontal component which is passed to the first half-wave plate 52, as shown in the forward direction diagram 106 of FIG. 16. The horizontal component is rotated into the vertical plane and the two vertically polarized components are rotated by 45° in a clockwise direction by the first rotator 102. The polarizer 54 passes the components to the second rotator 104 which rotates them again by 45° in the clockwise direction. The lower component is rotated into the vertical plane by the second half-wave plate 56 and is walked up to the other horizontal component by the second SWP 12 so as to be incident on the second port 6. Light incident on the second port 6 returns via the same path, as shown in the reverse direction diagram 108 of FIG. 16, until the second rotator 104 rotates the components clockwise by 45° so as to be polarized in the 135°–225° diagonal plane. The polarizer 54 then prevents the components from proceeding further to the first port 4.

Light of the wavelength $\lambda_1$ incident on the first port 4 follows the same path as light of the wavelength $\lambda_2$ to the second port 6, as shown in the forward direction polarization diagram 110 of FIG. 17. In the reverse direction, for light incident on the second port 6, as shown in the polarization diagram 112, the horizontal components received by the second rotator 104 are rotated in an anticlockwise direction by 45°, instead of the clockwise direction for wavelength $\lambda_2$. This occurs because for $\lambda_1$ the optical rotator of the rotator 104 produces no effective rotation but for $\lambda_1$ the optical rotator of the rotator 104 produces a 45° effective rotation, according to Table 1. The 45°–225° polarized components are therefore allowed to pass by the polarizer 54 and are rotated into the vertical plane by the second rotator 102. The lower vertically polarized component is rotated into the horizontal plane by the first half-wave plate 52 and the two components are then combined by the first SWP 10 so as to be incident on the first port 4.

If the first Faraday/optical rotator 102 induces errors by producing an effective 45° rotation in the anticlockwise direction, for signals of $\lambda_2$ incident on the first port 4, the components are prohibited from proceeding to the second rotator 104 and the second port 6 by the polarizer 54, as shown in the forward direction diagram 114 of FIG. 18. For the reverse direction, as shown in diagram 116, signals incident on the second port 6 travel the same path as that shown in FIG. 16. For signals of $\lambda_1$ incident on the first port 4, the path is the same as that for diagram 114 of FIG. 18, as shown in the forward direction diagram 118 of FIG. 19. In the reverse direction, as shown in diagram 120 of FIG. 19, the components polarized in the 45°–225° plane which are incident on the first rotator 102 are rotated into the horizontal plane, instead of the vertical plane, and the lower component is then rotated by the half-wave plate 52 into the vertical plane. The lower vertical component is walked out of the isolator 100 before reaching the first port 4 and the upper horizontally polarized component passes above the half-wave plate 52 through the first SWP 10 and is dispersed above the first port 4.

If, however, errors are induced by the second Faraday/optical rotator 104, wherein the rotator 104 produces an effective 45° in a direction opposite to that shown in the diagrams 106 to 112 of FIGS. 16 and 17, then for light incident on the first port 4, as shown in the forward direction diagram 122 of FIG. 20, the second rotator 104 rotates the components received into the vertical plane. The lower vertical plane is rotated in the horizontal plane by the second half-wave plate 56 and passes unchanged through the second SWP 12 so as to be dispersed below the second port 6. The upper vertical component passes above the second half-wave plate 56 and is walked out of the isolator 100 by the second SWP 12 before reaching the second port 6. For light incident on the second port 6, as shown in the reverse direction diagram 124 the second rotator 104 outputs components polarized in the 45°–225° diagonal plane, which are allowed to pass by the polarizer 54 to the first rotator 102. The first rotator 102 rotates the components into the horizontal plane and the upper component passes directly to the first SWP 10 and is allowed to pass therethrough unchanged so as to be dispersed above the first port 4. The lower component is rotated into the vertical plane by the first half-wave plate 52 and is walked out of the isolator 100 by the first SWP 10. The signals of wavelength $\lambda_1$, the path is the same in the forward direction as for signals of $\lambda_2$, as shown in the polarization diagrams 126 of FIG. 21 and 122 of FIG. 20. In the reverse direction, as shown in diagram 128 of FIG. 21, the second rotator 104 outputs components polarized in the 135°–315° diagonal plane which are prohibited from proceeding to the first rotator 102 and the first port 4 by the polarizer 54.

The rotator elements of all of the isolators 2, 30, 50, 80 and 100 can be selected so that the various isolator functions can be performed for more than two wavelengths. For example, wavelengths $\lambda_1$, $\lambda_2$ and $\lambda_4$ may be isolated, and the isolator could be made transparent to wavelengths $\lambda_3$ and $\lambda_5$. The Faraday elements of all the isolators 2, 30, 50, 80 and 100 may be a single Faraday element or a cascade of Faraday elements to obtain their required thickness or rotation characteristic.

I claim:

1. An optical isolator comprising two polarizers, two input/output ports formed, respectively, on said two polarizers, a first optical rotator disposed between said two polarizers, said first optical rotator including a Faraday rotator and a reciprocal optical rotator and a second optical rotator, each of the first and second optical rotators respectively abutting said two polarizers and a third polarizer disposed between the first and second optical rotators, said isolator being able to perform a selected one of a plurality of isolator functions on light of at least two different wavelength bands propagating, in use, through said isolator, said isolator functions including:

(a) isolating light in one of said wavelength bands and allowing light in the other one of said wavelength bands to pass between said ports in forward and reverse directions;
   (b) isolating light in both of said wavelength bands;
   (c) isolating light in one of said wavelength bands and partially isolating light in the other one of said wavelength bands; and
   (d) isolating light in one of said wavelength bands in a forward direction and isolating light in the other one of said wavelength bands in a reverse direction;

wherein said selected one of said plurality of isolator functions is selected by selecting wavelength dispersion characteristics of said first optical rotator; and
   wherein said reciprocal optical rotator includes a segmented reciprocal optical rotator having at least two light receptive sections, one of said at least two light receptive sections including a transmissive medium and another of said at least two light receptive sections including optical rotating material.

2. An optical isolator as claimed in claim 1, wherein said segmented reciprocal optical rotator abuts the polarizer on which said ports are formed.

3. The optical isolator as recited in of claim 1, wherein the reciprocal optical rotator comprises multi-order half-wave plates.

4. The optical isolator as recited in claim 3, wherein the multi-order half-wave plates each comprises quartz.

5. The optical isolator as recited in claim 1, wherein the reciprocal optical rotator comprises optically active material.

6. The optical isolator as recited in claim 1, wherein said isolator function (a) is selected and wherein:

the Faraday rotator comprises first wavelength dispersion characteristics to rotate a plane of the light in the other one of said wavelength bands 45° in a clockwise direction with respect to a plane of the light in the one of said wavelength bands; and
   wherein the reciprocal optical rotator comprises second wavelength dispersion characteristics to always move the light in the one of said wavelength bands and the light in the other one of said wavelength bands into a same plane.

7. The optical isolator as recited in claim 1, wherein said isolator function (b) is selected and wherein:

the Faraday rotator comprises first wavelength dispersion characteristics to rotate the light in the one of said wavelength bands an odd multiple of 45° in a clockwise direction and to rotate the light in the other one of said wavelength bands an odd multiple of 45° in the clockwise direction so as to be in a same plane as the light in the one of said wavelength bands; and
   wherein the reciprocal optical rotator comprises second wavelength dispersion characteristics to always keep the light in the one of said wavelength bands and the light in the other one of said wavelength bands in the same plane.

8. The optical isolator as recited in claim 1, wherein said isolator function (d) is selected and wherein:

the Faraday rotator comprises first wavelength dispersion characteristics to rotate the light in the one of said wavelength bands an odd multiple of 45° in a clockwise direction and to rotate the light in the other one of said wavelength bands an odd multiple of 45° in the clockwise direction such that the light in the one of said wavelength bands and the light in the other one of said wavelength bands are in a same plane; and wherein the reciprocal optical rotator comprises second wavelength dispersion characteristics to always move the light in the one of said wavelength bands and the light in the other one of said wavelength bands into respective planes which are orthogonal to one another.

9. The optical isolator as recited in claim 1, wherein said isolator function (d) is selected and wherein:

the Faraday rotator comprises first wavelength dispersion characteristics to rotate the light in the one of said wavelength bands an odd multiple of 45° in a clockwise direction into a first plane and to rotate the light in the other one of said wavelength bands an odd multiple of 45° in the clockwise direction into a second plane such that the first and second planes are orthogonal to one another; and wherein the reciprocal optical rotator comprises second wavelength dispersion characteristics to always keep the light in the one of said wavelength bands and the light in the other one of said wavelength bands in respective planes which are orthogonal to one another.

\* \* \* \* \*